(12) United States Patent
Landers et al.

(10) Patent No.: US 10,808,641 B2
(45) Date of Patent: Oct. 20, 2020

(54) MOBILE MACHINES, ELECTRIC DRIVE SYSTEMS, AND METHODS FOR TESTING ELECTRIC DRIVE SYSTEMS

(71) Applicant: Caterpillar Inc., Deerfield, IL (US)

(72) Inventors: Sean C. Landers, Elmwood, IL (US); Sangameshwar Sonth, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 185 days.

(21) Appl. No.: 16/172,963

(22) Filed: Oct. 29, 2018

(65) Prior Publication Data

US 2020/0132009 A1 Apr. 30, 2020

(51) Int. Cl.
| | |
|---|---|
| *G01M 15/04* | (2006.01) |
| *F02D 41/22* | (2006.01) |
| *F02D 41/24* | (2006.01) |
| *F02D 41/30* | (2006.01) |
| *B60L 15/20* | (2006.01) |
| *B60W 30/188* | (2012.01) |
| *B60W 20/40* | (2016.01) |
| *B60W 10/188* | (2012.01) |

(52) U.S. Cl.
CPC ........ *F02D 41/221* (2013.01); *B60L 15/2009* (2013.01); *B60W 10/188* (2013.01); *B60W 20/40* (2013.01); *B60W 30/1882* (2013.01); *F02D 41/2438* (2013.01); *F02D 41/3076* (2013.01); *G01M 15/044* (2013.01); *B60L 2240/12* (2013.01); *B60L 2240/423* (2013.01); *B60W 2300/125* (2013.01); *B60Y 2200/411* (2013.01); *F02D 2250/24* (2013.01)

(58) Field of Classification Search
CPC ............................ G01M 15/04; G01M 15/044

USPC .............................. 73/114.13, 114.14, 114.15
See application file for complete search history.

(56) References Cited

U.S. PATENT DOCUMENTS

| | | | |
|---|---|---|---|
| 7,437,916 B2 | 10/2008 | Beach et al. | |
| 7,950,481 B2 | 5/2011 | Betz et al. | |
| 2005/0016295 A1* | 1/2005 | Kemnade ............ | G01M 15/046 73/862.28 |
| 2006/0020383 A1* | 1/2006 | Betz ...................... | B60W 20/10 701/50 |

(Continued)

FOREIGN PATENT DOCUMENTS

| | | |
|---|---|---|
| EP | 1281948 A1 | 2/2003 |
| WO | 2015002597 A1 | 1/2015 |

*Primary Examiner* — Eric S. McCall
(74) *Attorney, Agent, or Firm* — Calfee, Halter & Griswold LLP

(57) ABSTRACT

A method for testing power of an electric drive system includes setting the electric motor of the electric drive system to a desired speed and applying a brake load to the system. The method also includes increasing the brake load until an engine of the electric drive system is fully loaded. After the engine is fully loaded, the method includes maintaining the brake load until the acceleration remains between the upper predetermined threshold and the lower predetermined threshold for the predetermined period of time, which indicates that the engine has stabilized at full power. Once the engine is at full power, the commanded power of the electric drive system required for stabilizing the engine at full power is averaged, and the average power is compared to a predetermined pass/fail threshold to determine if the electric drive system has sufficient power.

20 Claims, 7 Drawing Sheets

(56) References Cited

U.S. PATENT DOCUMENTS

| | | | |
|---|---|---|---|
| 2006/0125319 A1* | 6/2006 | King | B60L 58/20 307/10.1 |
| 2008/0133077 A1* | 6/2008 | Akaki | B60W 20/00 701/22 |
| 2010/0323844 A1* | 12/2010 | Okubo | B60W 10/08 477/3 |
| 2016/0229295 A1* | 8/2016 | Hoffmann | B60K 6/46 |
| 2016/0236693 A1* | 8/2016 | Hawkins | F02N 11/0862 |

* cited by examiner

MOBILE MACHINES, ELECTRIC DRIVE SYSTEMS, AND METHODS FOR TESTING ELECTRIC DRIVE SYSTEMS

TECHNICAL FIELD

The present disclosure relates generally to mobile machines and electric drive systems for mobile machines. In particular, the present disclosure relates to methods for testing the power of electric drive systems for mobile machines, and to electric drive systems that have a controller configured to perform methods for testing the power of the electric drive systems.

BACKGROUND

An engine power test is used to test whether an engine of a vehicle is high or low on power, and it can be used to test an engine prior to being installed on a chassis of a vehicle, at the end-of-line after machine build, or during servicing of the vehicle. For a vehicle having a powershift transmission, a torque converter stall test has traditionally been used to test the engine power. The torque converter stall test generally includes obtaining the stall speed of an engine and comparing the stall speed to a predetermined pass/fail threshold. The stall speed is obtained by engaging a brake pedal to apply a brake load to keep the vehicle stationary, shifting the transmission of the vehicle into drive, accelerating the engine for two to three seconds, and reading the speed of the engine (e.g., by a tachometer of the vehicle). During this test, the torque converter's impeller is spinning at maximum speed (due to the acceleration of the engine) while the torque converter's turbine is being held stationary (due to the applied brake load).

Several vehicles today have replaced powershift transmissions with electric drive systems. Rather than using a torque converter, electric drive systems include a generator that converts mechanical power from an engine to electrical power and provides the electrical power to an electric motor, which is used to power the vehicle. Because electric drive systems do not have a torque converter, the traditional torque converter stall test cannot be used to test the power of the electric drive system.

SUMMARY

An exemplary mobile machine includes a main frame, an undercarriage having one or more drive members; and an electric drive system for providing power to the one or more drive members of the undercarriage. The electric drive system includes an engine, an electric motor, a generator, power electronics and one or more controllers. The electric motor is operatively connected to the one or more drive members of the undercarriage. The generator is operatively connected to the engine and configured to convert mechanical energy from the engine to electrical energy for providing to the electric motor. The power electronics are configured to control the electrical energy that is provided to the electric motor by the generator. The one or more controllers are in circuit communication with at least one of the engine, the electric motor, and the generator. The one or more controllers are configured to set the electric motor to a desired commanded speed and apply an initial commanded brake load to the electric drive system. In addition, the one or more controllers are configured to increase the initial brake load until the engine is fully loaded and stabilize the engine at full power after the engine is fully loaded. The one or more controllers are also configured to calculate an average power of the electric drive system after the engine is stabilized at full power.

An exemplary electric drive system for a mobile machine includes an engine, an electric motor, a generator, power electronics, and one or more controllers. The electric motor is operatively connected to one or more drive members of the mobile machine. The generator is operatively connected to the engine and configured to convert mechanical energy from the engine to electrical energy for providing to the electric motor. The power electronics are configured to control the electrical energy that is provided to the electric motor by the generator. The one or more controllers are in circuit communication with at least one of the engine, the electric motor, and the generator. The one or more controllers are configured to set the electric motor to a desired commanded speed and apply an initial commanded brake load to the electric drive system. In addition, the one or more controllers are configured to increase the initial brake load until the engine is fully loaded and stabilize the engine at full power after the engine is fully loaded. The one or more controllers are also configured to calculate an average power of the electric drive system after the engine is stabilized at full power.

An exemplary method for testing power of an electric drive system having an engine and an electric motor includes setting the electric motor to a desired commanded speed and applying an initial brake load to the electric drive system. In addition, the method includes increasing the initial brake load until the engine is fully loaded and stabilizing the engine at full power after the engine is fully loaded. The method also includes calculating an average power of the electric drive system after the engine is stabilized at full power.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

The present application discloses mobile machines having an electric drive system, and methods for testing the power of the electric drive system. In certain embodiments, the electric drive system includes a master controller that is configured to perform the disclosed methods for testing the power of the electric drive system. The disclosed methods generally include commanding an electric motor of the electric drive system to a desired speed and stepping up a brake load to the electric drive system until an engine of the electric drive system is fully loaded. Once the engine is fully loaded, the method generally includes waiting for the engine to stabilize at full power and calculating a commanded power of the electric motor that is required to stabilize the engine at full power. The average commanded power of the electric motor is then compared to a pass/fail threshold to determine if the electric drive system has sufficient power, or if any components of the electric drive system need to be serviced or replaced.

Figure 1:
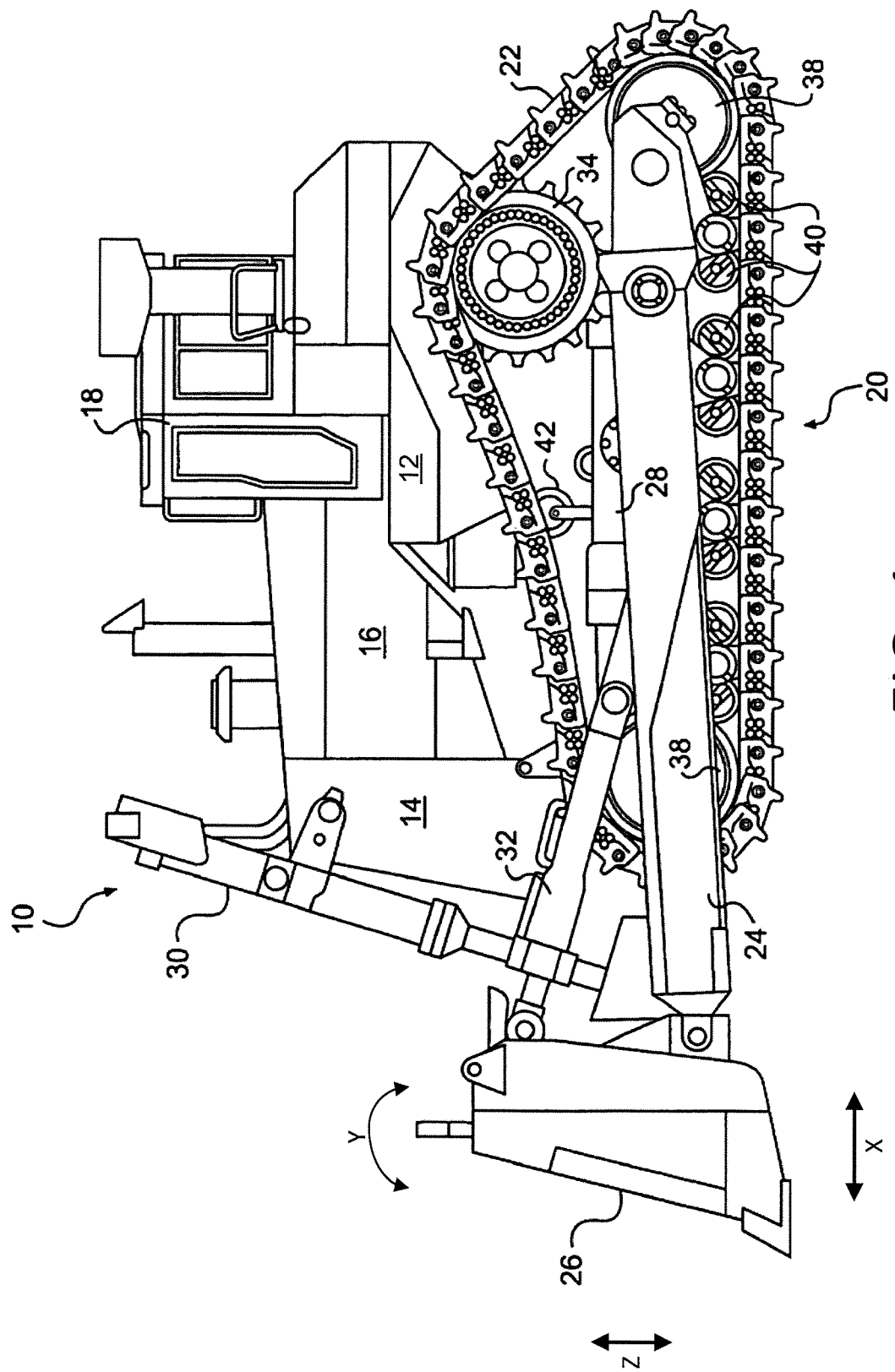
FIG. 1 is a side view of an exemplary mobile machine.

FIG. 1 illustrates an exemplary mobile machine 10 that includes a drive system 12. The mobile machine 10 will be described herein as having an electric drive system 12, but it should be understood that the mobile machine and the methods described herein can also include other types of drive systems, such as, for example, a hydrostatic drive system (e.g., Hydrostatic drive system 12' shown in FIG. 2A). In embodiments having an electric drive system 12, the electric drive system can take any suitable form, such as, for example, any form described in the present application or any form described in U.S. Pat. No. 7,950,481, which is incorporated by reference in its entirety. While the illustrated embodiment shows the mobile machine 10 as a track-type tractor, it should be understood that the mobile machine 10 can be any mobile machine having an electric drive system 12, such as, for example, a track-type loader, a hydraulic excavator, a skid steer loader, an agricultural tractor, a wheel loader, or any other mobile machine known to a person having ordinary skill in the art.

Referring to FIG. 1, the exemplary mobile machine 10 includes a main frame 14, an undercarriage 20, work implement 26, one or more push arms 24, one or more lift cylinders 30, one or more tilt cylinders 32, a work station 18, and an electric drive system 12. The electric drive system 12 provides power to the mobile machine 10 and can take any suitable form, such as, for example, any form described in the present application. The main frame 14 houses a power source 16 that is configured to provide power to the various components of the mobile machine 10. The power source 16 can be, for example, an internal combustion engine, such as, for example, a diesel engine, a gasoline engine, a gaseous fuel engine, or any other suitable type of engine. In alternative embodiments, the power source 16 can be a non-combustion source of power, such as, for example, a fuel cell, a power storage device (e.g., a battery pack), or other similar mechanism. The work station 18 is the space where the user of the mobile machine 10 controls the mobile machine. The work implement 26 can include any suitable work tool or attachment, such as, for example, a blade, a bucket, a ripper, a compactor, forks, a plow, a trencher, or any other known attachment.

The undercarriage 20 includes a roller frame 28, one or more driving members 34, one or more idler wheels 38, one or more mid-rollers 40, one or more carrier rollers 42, and engaging tracks 22 (e.g., two ground engaging tracks). The engaging tracks 22 are located on both sides of the main frame and are configured to engage the ground and propel the mobile machine 10. The driving members 34 are configured to transmit power from the electric drive system to the engaging tracks 22 to propel the mobile machine 10. The driving members 34 can be, for example, gear reduction final drives. The idler wheels 38, the mid-rollers 40, and the carrier rollers 42 are configured to support and guide each of the engaging tracks 22 and to distribute the weight of the mobile machine 10 onto the portion of the engaging tracks 22 adjacent to the ground.

The work implement 26 is connected to at least one of the main frame 14 and the undercarriage 20 by at least one of push arms 24, lift cylinders 30, and the tilt cylinders 32. The push arms 24 are configured to move the work implement 26 in the direction X. As an alternative to the push arms 24, the work implement 26 can be connected to the main frame 14 by a power angle tilt (or "PAT") arrangement (not shown). The lift cylinders 30 are configured to move the work implement 26 in the direction Z. In certain embodiments, the lift cylinders 30 have a hydraulic actuator that is configured to extend to lower the work implement 26 relative to the ground and to retract to raise the work implement relative to the ground. The tilt cylinders 32 are configured to move the work implement 26 in the direction Y. In certain embodiments, the tilt cylinders 32 have a hydraulic actuator that is configured to extend to tilt the top of the work implement away from the main frame 14 and to retract to tilt the top of the work implement toward the main frame 14. While the work implement is shown being connected to the main frame 14 or the undercarriage 20 by the push arms 24, lift cylinders 30, and tilt cylinders 32, it should be understood that any suitable components and any suitable number of components can be used to connect the work implement 26 to the mobile machine 10.

Figure 2:
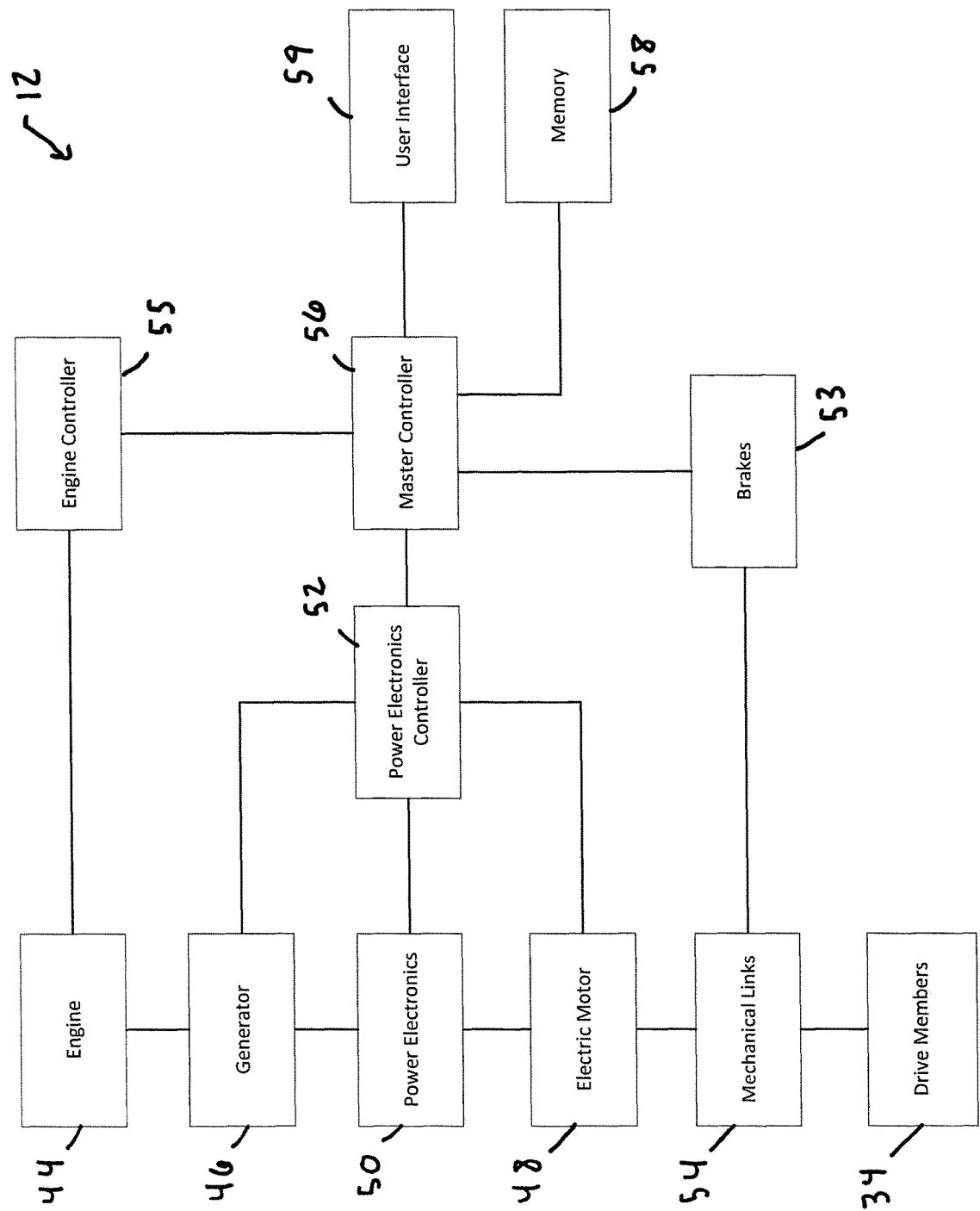
FIG. 2 is a schematic block diagram of an electric drive system for a mobile machine.

FIG. 2 illustrates an exemplary electric drive system 12 that can be used to provide power to a mobile machine (e.g., mobile machine 10 shown in FIG. 1). The electric drive system 12 includes an engine 44, a generator 46, and an electric motor 48. The engine 44 can be, for example, a diesel engine, a gasoline engine, a natural gas engine, a gas-turbine engine, or any other engine known in the art. The engine 44 may be operatively connected to the generator 46 such that the engine 44 is configured to drive the generator 46 to convert mechanical energy from the engine 44 into electrical energy for providing to the electric motor 48. The generator 46 may be any known AC or DC generator, such as, for example, a permanent magnet, induction, switched-reluctance, or a hybrid combination of the above. In addition, the generator 46 may be sealed, brushless, and/or liquid-cooled.

In certain embodiments, the electric drive system 12 can include power electronics 50 configured to convert at least a portion of mechanical energy into electric energy and control electricity provided to the electric motor 48. The power electronics 50 can include various components for converting mechanical energy to electrical energy and controlling electricity provided to the motor 48, such as, for example, a power inverter, an inverter controller, generator software, motor software, or any other known components. In some embodiments, the power electronics 50 is operatively connected to the generator 46, the electric motor 48, and a power electronics controller 52, and the power electronics controller 52 is configured to control the generator 46 and the electric motor 48 through the power electronics 50. For example, the power electronics controller 52 can be configured to start and stop the motor 48, cause the motor 48 to perform a forward or reverse rotation, regulate the speed of the motor 48, regulate the torque of the motor 48, apply or remove a retarding load or physical brakes to the motor 48, regulate the DC-BUS voltage of the generator, manipulate the current of the generator, etc. In some embodiments, the power electronics controller 52 is in circuit communication with the electric motor 48 and/or the generator 46, such that the power electronics controller 52 can receive sensor data (e.g., speed, temperature, etc.) from the electric motor and/or generator.

The electric motor 48 creates a torque for driving one or more mechanical links 54 that are operatively connected to the driving members 34 of a mobile machine 10. While FIG. 2 refers to one electric motor 48, it should be understood that the electric drive system 12 can include two or more electric motors that are mechanically combined via a gear or gear train. The electric motor(s) 48 can be any known AC or DC motor, such as, for example, permanent magnet, induction, switched-reluctance, or a hybrid combination of the above. In addition, the electric motor(s) 48 can be sealed, brushless, and/or liquid-cooled. The mechanical links 54 can be, for example, a gear assembly. In certain embodiments, the mechanical links 54 are operatively connected to brakes 53 such that a brake load can be applied to the electric drive system 12. In other embodiments, however, the brakes 53 can be operatively connected to any other component of the electric drive system 12 that allows for a brake load to be applied to the electric drive system. In some embodiments, the mechanical links 54 are operatively connected to a differential steering unit (not shown) such that speed and torque of the electric motor 48 provides a desired propulsion output to the one or more driving members 34.

In certain embodiments, the electric drive system 12 includes a master controller 56 that is configured to control the engine 44, the generator 46 (through the power electronics controller 52) and the electric motor 48 (through the power electronics controller 52), and the brakes 53, such that the electric drive system can be operated in a coordinated and controlled fashion. For example, the master controller 56 can be configured to start or stop the engine 44 and/or the electric motor 48, as well as apply the brakes 53 to the electric drive system 12. The master controller 56 can include a processor, a memory, and an input/output circuit. The memory, which may or may not comprise a battery backed RAM, may include instructions for controlling operation of the electric drive system 12. The input/output circuit may receive and send communications to and from sensors and/or additional controllers and/or actuators throughout the mobile machine 10, and the processor may carry out instructions initiated internally or externally of the master controller 56. The master controller 56 may also be in circuit communication with a memory 58 that is incorporated into, or external to, the controller 56. A computer read/write device, which can be part of the controller 56, may also be employed to read data from and/or write data to the memory 58 in response to communications from the controller 56. In certain embodiments, the electric drive system 12 includes a user interface 59 that allows a user to set operating parameters electric drive system, observe system operations, and control system performance.

In some embodiments, the electric drive system 12 includes an engine controller 55 that is operatively connected with the engine 44 and the master controller 56. The engine controller 55 can be configured start or stop the engine 44, regulate the speed of the engine 44, or control the engine 44 in any other manner that is needed for the electric drive system 12 to be operated in a coordinated in controlled fashion. In some embodiments, the engine controller 55 receives commands from the master controller 56, and the engine controller 55 then commands the engine 44 to act in accordance with the commands from the master controller 56.

Figure 2A:
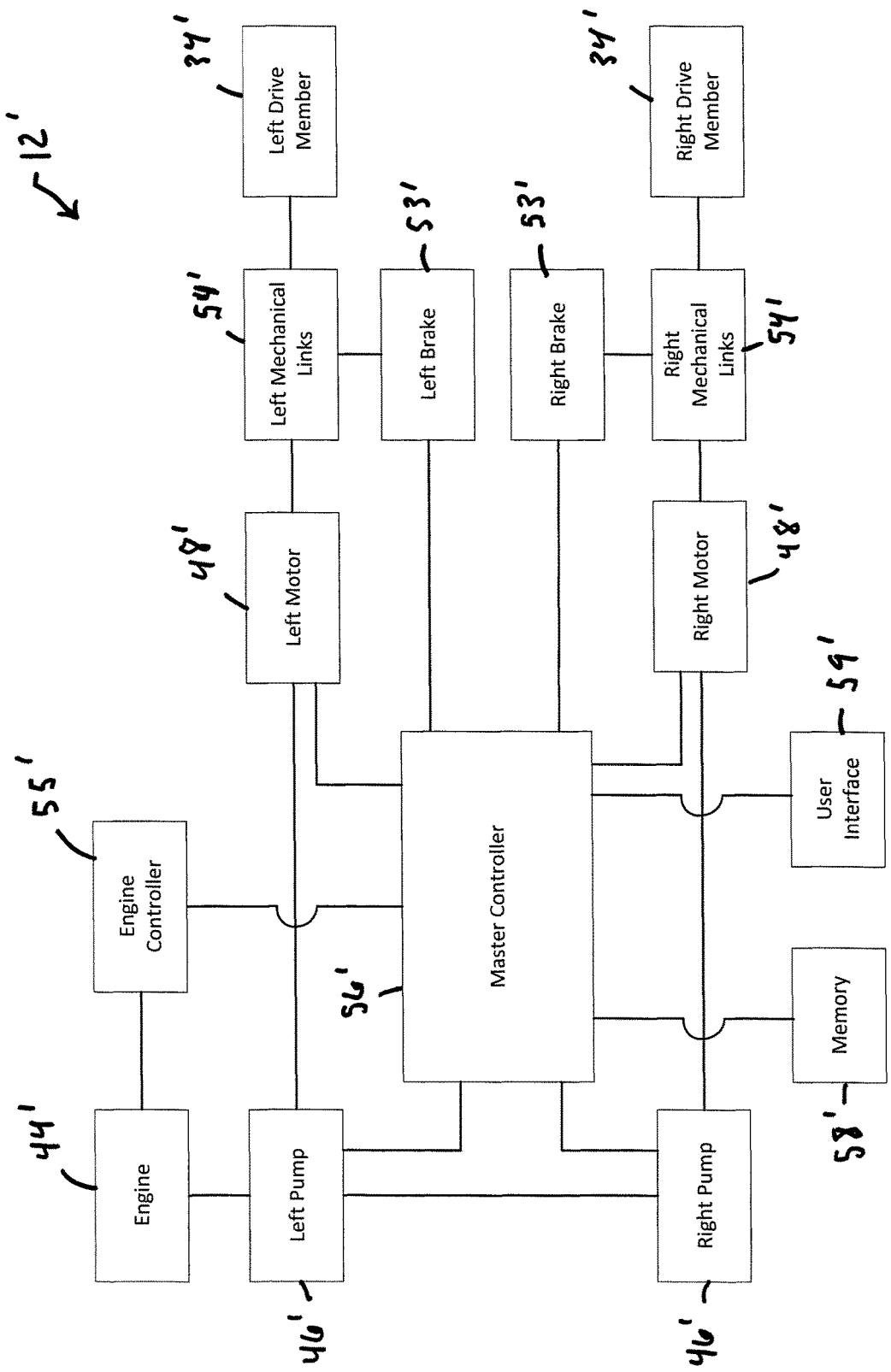
FIG. 2A is a schematic block diagram of a hydrostatic drive system for a mobile machine.

FIG. 2A illustrates an exemplary Hydrostatic drive system 12' that can be used to provide power to a mobile machine (e.g., mobile machine 10 shown in FIG. 1). The Hydrostatic drive system 12' includes an engine 44', left and right pumps 46', and left and right motors 48'. The engine 44' can be, for example, a diesel engine, a gasoline engine, a natural gas engine, a gas-turbine engine, or any other engine known in the art. The engine 44' may be operatively connected to the left and right pumps 46' such that the pumps 46' can convert mechanical energy from the engine 44' into fluid energy for providing to the motors 48'. The pumps 46' may be any known hydraulic pump, such as, for example, gear pumps, rotary vane pumps, piston pumps, peristaltic pumps, or any other suitable hydraulic pump that is capable of providing fluid energy to the motors 48'.

The motors 48' creates a torque for driving one or more mechanical links 54' that are operatively connected to one or more driving members 34' of a mobile machine 10. The motors 48' can be any known hydraulic motor. The mechanical links 54' can be, for example, a gear assembly. In certain embodiments, the mechanical links 54' are operatively connected to brakes 53' such that a brake load can be applied to the Hydrostatic drive system 12'. In other embodiments, however, the brakes 53' can be operatively connected to any other component of the Hydrostatic drive system 12' that allows for a brake load to be applied to the Hydrostatic drive system.

In certain embodiments, the Hydrostatic drive system 12' includes a master controller 56' that is configured to control the engine 44', the pumps 46', the motors 48', and the brakes 53', such that the Hydrostatic drive system 12' can be operated in a coordinated and controlled fashion. For example, the master controller 56' can be configured to start or stop the engine 44 and/or the motors 48', as well as apply the brakes 53' to the Hydrostatic drive system 12'. The master controller 56' can include a processor, a memory, and an input/output circuit. The memory, which may or may not comprise a battery backed RAM, may include instructions for controlling operation of the drive system 12'. The input/output circuit may receive and send communications to and from sensors and/or additional controllers and/or actuators throughout the mobile machine 10, and the processor may carry out instructions initiated internally or externally of the master controller 56'. The master controller 56' may also be in circuit communication with a memory 58' that is incorporated into, or external to, the controller 56'. A computer read/write device, which can be part of the controller 56', may also be employed to read data from and/or write data to the memory 58' in response to communications from the controller 56'. In certain embodiments, the Hydrostatic drive system 12' includes a user interface 59' that allows a user to set operating parameters for the Hydrostatic drive system, observe system operations, and control system performance.

In some embodiments, the Hydrostatic drive system 12' includes an engine controller 55' that is operatively connected with the engine 44' and the master controller 56'. The engine controller 55' can be configured to start or stop the engine 44', regulate the speed of the engine 44', or control the engine 44' in any other manner that is needed for the Hydrostatic drive system 12' to be operated in a coordinated in controlled fashion. In some embodiments, the engine controller 55' receives commands from the master controller 56', and the engine controller 55' then commands the engine 44' to act in accordance with the commands from the master controller 56'.

Figure 3:
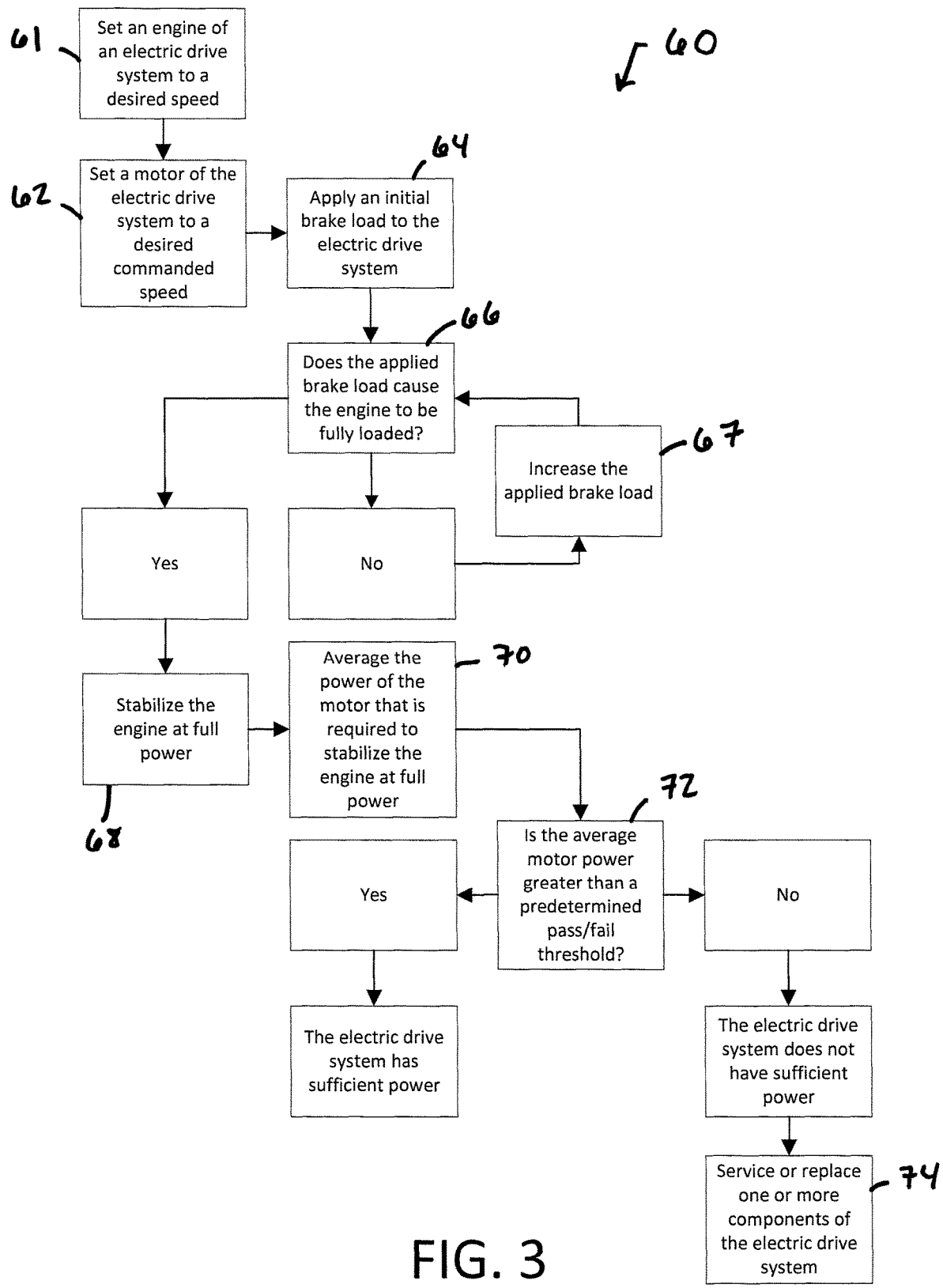
FIG. 3 is a flow chart of an exemplary method for testing the power of an electric motor.

FIG. 3 illustrates a flow chart representing a method 60 of testing the power of an electric drive system 12. Referring to box 61, the method 60 includes setting the engine 44 to a desired speed. Various factors are relevant in determining the desired speed of the engine 44, such as, for example, the specifications of the various components of the electric drive system 12, the type of engine 44, the type of electric motor 48, the brake dissipation of the electric drive system 12, the characteristics of the brakes 53, or any other factor that affect the brake cooling capability of the electric drive system 12. In certain embodiments, the desired speed of the engine 44 can be between about 1600 rpm and 1800 rpm, such as about 1700 rpm.

Referring to box 62, the method 60 subsequently includes setting the electric motor 48 to a commanded speed. In certain embodiments, the commanded speed is set to ensure that the electric drive system 12 has an adequate brake cooling capability for the brake power being requested throughout the method 60. Various factors are relevant in determining the commanded speed, such as, for example, the specifications of various components of the electric drive system 12, the type of electric motor 48, the brake dissipation of the electric drive system 12, the characteristics of the brakes, or any other factor that affect the brake cooling capability of the electric drive system 12. In certain embodiments, the commanded speed of the motor 48 can be between about 3000 rpm and about 10000 rpm, such as between about 3000 rpm and about 8000 rpm, such as between about 4000 rpm and about 6000 rpm, such as between about 4500 rpm and about 5500 rpm, such as between about 4500 rpm and about 4750 rpm, such as between about 4600 rpm and about 4700 rpm. In other embodiments, the commanded speed of the motor 48 can be set using ground speed (e.g., mph, kph, etc.), and the commanded speed of the motor 48 can be between about 2 mph and about 10 mph. In some embodiments, after the electric motor 48 is set to the commanded speed, the method 60 includes a user commanding the electric drive system 12 to be shifted into forward or reverse.

Referring to box 64, after the electric motor 48 is set to the commanded speed, the method 60 includes applying an initial commanded brake load to the electric drive system 12. In certain embodiments, the initial commanded brake load is applied by increasing a normalized brake command, which causes the speed of the motor 48 to decrease. In other embodiments, the initial command brake load is applied by stepping down the brake current, which increases the brake torque and causes the speed of the motor 48 to decrease. For example, the brake current is initially stepped down between about 0.5 amperes and about 0.6 amperes, and the applied brake torque can be, for example, between about 0 N-m and about 1000 N-m.

Referring to box 66, after the initial brake load is applied to the electric drive system 12, the method 60 includes determining whether the applied brake load causes the engine 44 to be fully loaded. In certain embodiments, the engine 44 is determined to be fully loaded when the power of the motor 48 exceeds a predetermined threshold. The predetermined threshold for the power of the motor 48 depends on the type of motor 48 that is being used, the lug curve of the engine 44, software feature settings set by a user, the efficiency of the electric drive system, or any other factor considered relevant to one having ordinary skill in the art. In certain embodiments, the predetermined threshold for the power of the motor can be between about 50 kW and about 650 kW. In other embodiments, the engine 44 is determined to be fully loaded when the speed of the motor 48 decreases below a predetermined threshold. The predetermined threshold for the speed of the motor 48 depends type of motor 48 that is being used, the lug curve of the engine 44, software feature settings set by a user, efficiency of the electric drive system, or any other factor considered relevant to one having ordinary skill in the art. In alternative embodiments, the engine 44 is determined to be fully loaded when the speed of engine 44 decreases below a predetermined threshold. The predetermined threshold for the speed of the engine 44 depends on the type of engine 44 that is being used, the lug curve of the engine 44, software feature settings set by a user, or any other factor considered relevant to one having ordinary skill in the art. In certain embodiments, the predetermined threshold for the speed of the engine 44 can be between about 1500 rpm and about 1700 rpm.

If the engine is determined to be fully loaded as a result of the applied commanded brake load, then the method 60 includes moving on to the step shown at box 68, which is discussed in more detail below. Referring to box 67, if the engine is not fully loaded due to the initial commanded brake load, the method 60 includes increasing the commanded brake load. After the commanded brake load is increased, the method 60 includes again determining whether the applied brake load causes the engine 44 to be fully loaded (e.g., determining whether the speed of the engine 44 decreases below the first predetermined threshold). If the engine is fully loaded, then the method 60 includes moving onto the step shown at box 68, and, if not, then the method 60 includes continuing the steps shown at boxes 66 and 67 (i.e., increasing of the commanded brake load until the engine is fully loaded). In certain embodiments, referring to the step shown at box 67, the commanded brake load is increased a predetermined amount after the initial commanded brake load is applied. This increase in brake command can be between about 1 normalized command per control loop and about 10 normalized command per control loop. In another example, the brake current can be stepped down between about 0.005 amperes and 0.015 amperes to increase the brake torque. In yet another example, the brake current can be stepped down about 0.01 amperes to increase the brake torque. In any of the above embodiments, the master controller 56 (FIG. 2) can be configured to increase the commanded brake load until the engine 44 is fully loaded. In some embodiments, after the engine 44 is determined to be fully loaded, an additional step can be used to determine if the engine is loaded as much as possible. For example, if the speed of the motor 48 decreases to below a predetermined threshold that ensures the motor 48 is operating in a desired region for measurement, then the engine 44 is loaded as much as possible. The predetermined threshold for the speed of the motor 48 to be operating in a desired region for measurement depends on the type of motor 48 that is being used, the lug curve of the motor 48, software feature settings set by a user (e.g., motor control schemes, PID controller settings, operating limits, etc.), or any other factor considered relevant to one having ordinary skill in the art. In certain embodiments, the predetermined threshold for the speed of the motor can be between about 1000 rpm and about 8000 rpm.

Referring to box 68, after the engine 44 is fully loaded due to the applied brake load, the method 60 includes stabilizing the engine 44 at full power. In certain embodiments, the engine 44 is stabilized at full power by maintaining the commanded brake load (such that the engine 44 is fully loaded) and waiting for the acceleration of the engine 44 to settle between set thresholds for a predetermined amount of time. The set thresholds for the acceleration of the engine 44 depends on the type of engine 44 that is being used, the lug curve of the engine 44, the electric drive system 12 response to the engine 44 at full load, software feature settings set by a user (e.g., engine under speed control, PID settings, motor control settings, etc.), or any other factor considered relevant to one having ordinary skill in the art. In certain embodiments, the upper threshold for the acceleration can be between about 1 rpm per control loop and about 10 rpm per control loop, and the lower threshold for the acceleration can be between about −1 rpm per control loop and about −10 rpm per control loop. In some embodiments, the master controller 56 is configured to determine when the acceleration of the engine settles between the set thresholds.

In other embodiments, the engine 44 is stabilized at full power by maintaining the commanded brake load (such that the engine is fully loaded) and waiting for the speed of the engine 44 to increase above a predetermined threshold indicating that the engine 44 reached full power. The predetermined threshold for the speed of the engine depends on the type of engine 44 that is being used, the lug curve of the engine 44, software feature settings set by a user (e.g., engine under speed control, PID settings, motor control settings, etc.), or any other factor considered relevant to one having ordinary skill in the art. In certain embodiments, the predetermined threshold for the speed of the engine 44 can be between about 1500 rpm and about 1700 rpm. In some embodiments, the master controller 56 is configured to reduce the commanded motor speed (to reduce the brake torque being applied to the motor 48), which allows the speed of the engine 44 to increase to above the second predetermined threshold and stabilize at full power.

Referring to box 70, after the engine 44 stabilizes at full power, the power of the motor 48 that is required for the engine 44 to stabilize at full power is averaged over a predetermined period of time. The predetermined period of time depends on the type of engine 44 that is being used, the lug curve of the engine 44, the type of brakes 53, the cooling system of the electric drive system, or any other factor considered relevant to one having ordinary skill in the art. In certain embodiments, the predetermined period of time can be between about 1 second and about 15 seconds. Referring to box 72, after the power of the motor 48 is averaged for a predetermined period of time, the method 60 includes determining whether the average motor power is greater than a predetermined pass/fail threshold. That is, the motor 48 has a pass/fail power threshold that is used to determine if the electric drive system 12 has sufficient power. If the average power of the motor 48 is below the pass/fail power threshold, the electric drive system 12 does not have sufficient power. Conversely, if the average power of the motor 48 is at or above the pass/fail power threshold, the electric drive system 12 has sufficient power. The predetermined pass/fail power threshold depends on the type of motor 48 that is being used, the type of engine 44 that is being used, or any other factor considered relevant to one having ordinary skill in the art. In certain embodiments, the predetermined pass/fail threshold can be between about 5% and about 15% of the nominally expected power. In some embodiments, the method 60 includes simultaneously removing the brake load and commanding the motor 48 to zero speed after averaging the power of the motor. In certain embodiments, referring to box 74, if the electric drive system 12 does not have sufficient power, the method 60 can include servicing or replacing one or more components of the electric drive system 12.

While the illustrated embodiment of the method 60 at boxes 70 and 72 is testing the motor 48 to determine if the electric drive system 12 has sufficient power, it should be understood that any component of the electric drive system can be tested to determine if the electric drive system has sufficient power. For example, the motor shaft power, motor AC power, DC bus power, generator AC power, generator shaft power, battery supply power, etc. It is advantageous to be able to test various components of the electric drive system 12 because then a user would be able to determine which component(s) need to be serviced or replaced.

Referring to FIGS. 2 and 3, in certain embodiments, a user interface 59 is in circuit communication with the master controller 56. A user can provide commands to the controller 56 through the user interface 59 to perform the method 60 and determine whether an electric drive system 12 has sufficient power, and the user can receive information from the controller 56 through the user interface 59. In certain embodiments, the electric drive system 12 is configured such that the controller 56 performs one or more of the various steps of the method 60. For example, the controller 56 can be configured to increase the brake load until the engine 44 is fully loaded. In some embodiments, the controller 56 averages the power of the motor 48 over the predetermined period of time (as described with respect to box 70) and compares the calculated average power to the predetermined pass/fail threshold. In some embodiments, the controller 56 communicates the results of the method 60 to a user through the user interface 59. In some embodiments, the master controller 56 is configured to perform the steps of the method 60 shown in boxes 61-70 more than one time such that more than one average for the power of the motor is obtained, and then master controller 56 is configured to average these averages to obtain the value that will be compared to the predetermined pass/fail threshold discussed with reference to box 72. In certain embodiments in which the master controller 56 obtains various averages, the master controller 56 can be configured to reject averages that fall outside a predetermined standard deviation of the set of averages.

In some embodiments, the method 60 can include testing the brakes of an electric motor. As described above, the method 60 includes applying a brake load to the electric drive system 12 until the engine 44 is fully loaded (as shown boxes 64, 66, and 67). In order to test the brakes of the motor, the method 60 can include comparing the commanded brake load for achieving a fully loaded engine to a predetermined pass/fail threshold for the brake load. If the commanded brake load for obtaining full engine load exceeds the predetermined pass/fail threshold, the brakes can be considered to be worn to a level in which service or replacement is recommended. The predetermined pass/fail threshold for the brake load depends on the life of the brakes 53, the absolute torque capabilities of the brakes 53, or any other factor considered relevant to one having ordinary skill in the art.

While the method 60 is described as being used to determine the power of an electric drive system 12 for a mobile machine 10, it should be understood that the above method 60 can be used to test the power of an electric drive system for any type of vehicle. In addition, the above method can also be used to test any type of powertrain in which the power can be calculated. For example, with respect to Hydrostatic drive system 12', the power can be quantified using flow and pressure measurements.

Figure 4:
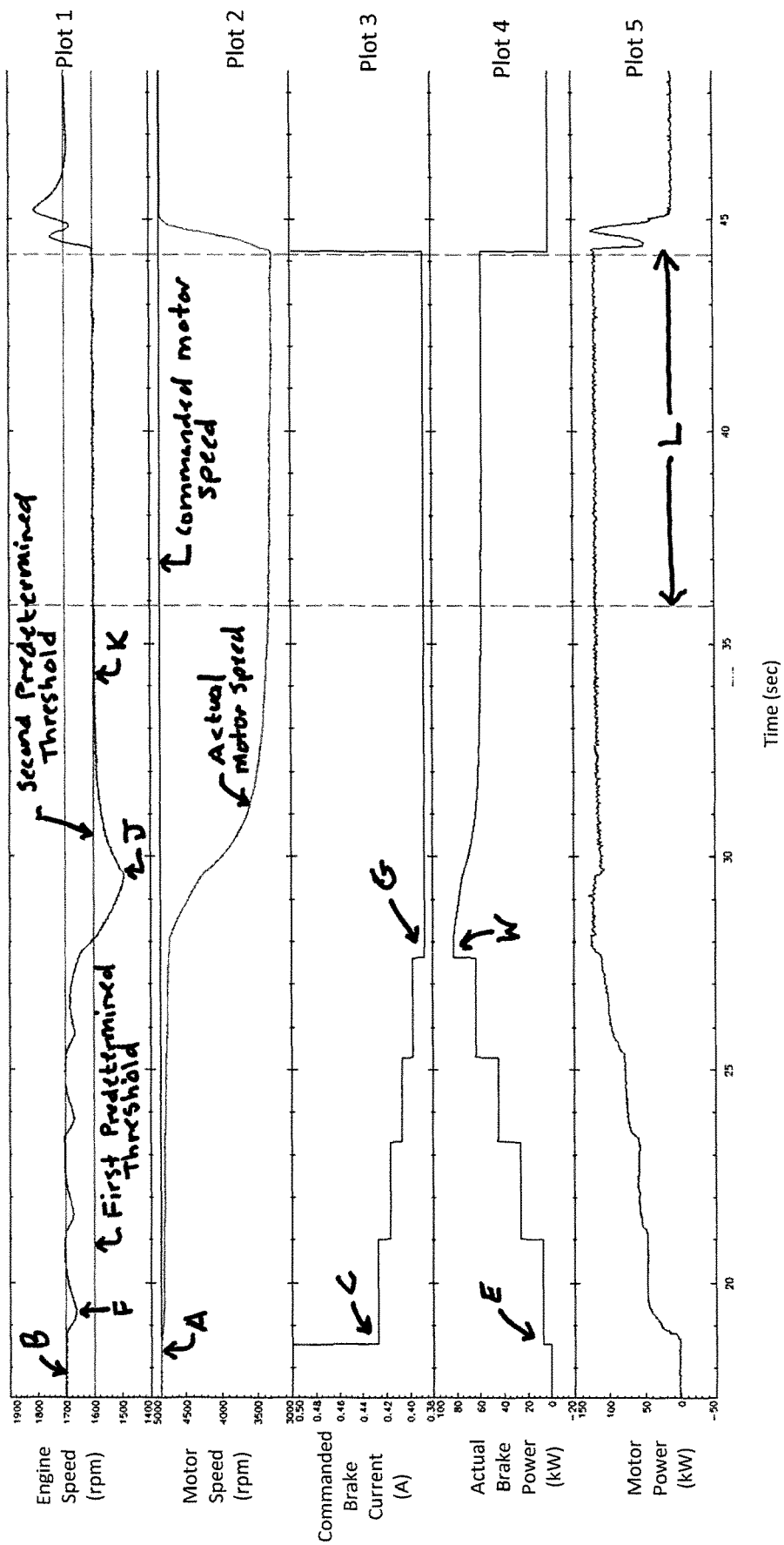
FIG. 4 illustrates various plots describing various characteristics of an electric motor with respect to time for one example of the method of FIG. 3.

FIG. 4 illustrates five plots (i.e., Plots 1-5) of various characteristics for an exemplary electric drive system 12 with respect to time during one example of the method 60 of FIG. 3. Plot 1 illustrates speed of the engine 44 (in rpm); Plot 2 illustrates the actual speed of the motor 48 (in rpm) and the commanded speed of the motor 48 (in rpm); Plot 3 illustrates the commanded brake current applied to the electric drive system 12 (in amperes); Plot 4 illustrates the actual brake power of the electric drive system 12 (in kW); and Plot 5 illustrates the power of the motor 48 (in kW). Referring to FIGS. 3 and 4, in this embodiment, the method 60 (as shown at boxes 61 and 62) includes setting the speed of the engine to 1700 rpm (as shown in Plot 1 at point B) and setting the electric motor 48 to a commanded speed of 4850 rpm (as shown in Plot 2 at point A).

Subsequently, in some embodiments, the method 60 (as shown at box 64) includes reducing the brake current from 1.0 A to about 0.43 A (as shown in Plot 3 at point C), which causes the actual brake power to step up from 0 kW to about 10 kW (as shown in Plot 4 at point E). In this embodiment, the first predetermined threshold for the speed of the engine 44 (as described with respect to box 66 in FIG. 3) is 1600 rpm. That is, engine 44 is considered to be fully loaded once the speed drops below 1600 rpm. After the commanded brake current decreased (as shown at point C on Plot 3 at a time of approximately 18.5 seconds), the speed of the engine 44 decreases to about 1660 rpm (as shown in Plot 1 at point F). Because the speed of the engine 44 did not decrease below 1600 rpm as a result of the initial increase in brake torque, the method 60 includes decreasing the commanded brake current until the speed of the engine 44 decreases below 1600 rpm (as described with respect to boxes 66 and 67). Referring to Plots 3 and 4, the brake current was reduced various times until the brake current was about 0.39 A (as shown in Plot 3 at point G), which caused the brake power to increase to about 80 kW (as shown in Plot 4 at point W). The 0.39 A commanded brake current caused the speed of the engine 44 to decrease below the predetermined threshold (i.e., 1600 rpm) to about 1500 rpm (as shown in Plot 1 at point J), such that the engine 44 was fully loaded. In some instances, it may be advantageous to have the engine speed drop well below the first predetermined threshold (e.g., in the illustrated embodiment, the engine speed decreases to 1500 rpm and the first predetermined threshold is 1600 rpm) to ensure that the engine 44 becomes fully loaded.

This embodiment of the method 60 subsequently includes maintaining the commanded brake current at 0.39 A (as shown in Plot 3 at point G) and waiting for the speed of the engine 44 to increase to a second predetermined threshold (as described with respect to box 68) indicating that the engine 44 is at full power. In this embodiment, the second predetermined threshold for the speed of the engine 44 (as described with respect to box 68 in FIG. 3) is 1600 rpm. That is, engine 44 is considered to be at full power and steady state speed once the speed stabilizes around 1600 rpm. Referring to Plot 1 at point K, the speed of the engine 44 increases to 1600 rpm at about the 33 second mark. After the speed of the engine stabilizes at full power (e.g., at about the 35 second mark), the method 60 includes averaging the motor power (as described with respect to box 70) that is required to stabilize the engine 44 at full power. Referring to Plot 5 at time period L (which is between about the 35 second mark and the 43 second mark), the average power for the motor 48 calculated to be about 100 kW. After the average power of the motor is calculated during this predetermined time period, the method 60 includes comparing the calculated average power to a predetermined pass/fail power threshold (as described with respect to box 72 in FIG. 3). In this embodiment, the predetermined pass/fail power threshold is about 120 kW, which indicates that the electric drive system 12 does not have sufficient power.

Figure 5:
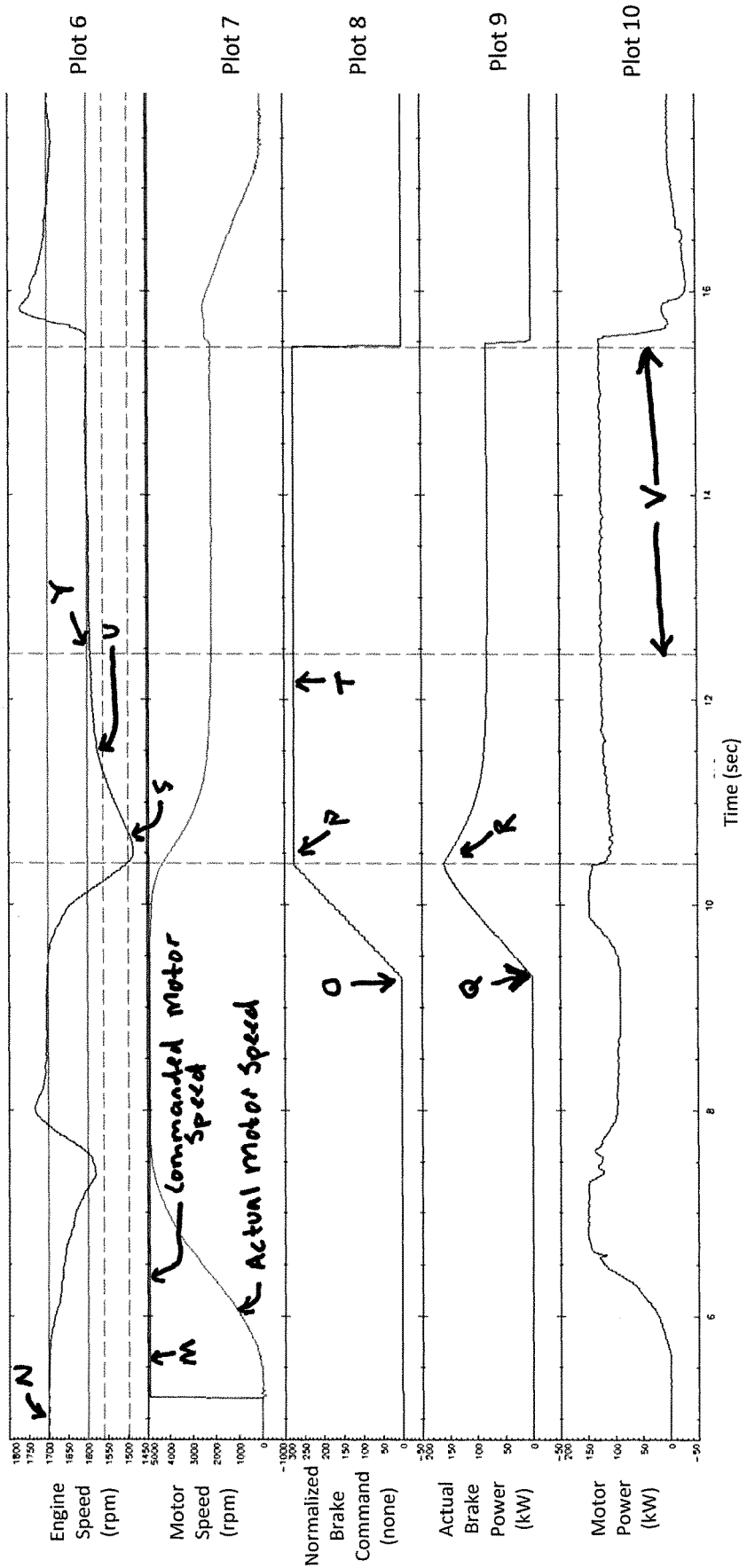
FIG. 5 illustrates various plots describing various characteristics of an electric motor with respect to time for another example of the method of FIG. 3.

FIG. 5 illustrates five plots (i.e., plots 6-10) of various characteristics for an exemplary electric drive system 12 with respect to time during another example of the method 60 of FIG. 3. Plot 6 illustrates speed of the engine 44 (in rpm); Plot 7 illustrates the actual speed of the motor 48 (in rpm) and the commanded speed of the motor 48 (in rpm); Plot 8 illustrates the normalized brake command; Plot 9 illustrates the brake power of the electric drive system 12 (in kW); and Plot 10 illustrates the power of the motor (in kW). Referring to FIGS. 3 and 5, in this embodiment, the method 60 (as shown at boxes 61 and 62) includes setting the speed of the engine to 1700 rpm (as shown in Plot 7 at point N) and setting the electric motor 48 to a commanded speed of 5000 rpm (as shown in Plot 8 at point M). In the illustrated embodiment, a master controller 56 of the electric drive system 12 has software that is configured to set the speed of the engine 44 and the commanded speed of the motor 48.

Subsequently, the method 60 (as shown at box 64) includes increasing the normalized brake command from 0 to 275 (as shown in Plot 8, starting at point O and ending at point P), which causes the brake power to increase from 0 kW to about 160 kW (as shown in Plot 9, starting at point Q and ending at point R). In this embodiment, the first predetermined threshold for the speed of the engine 44 (as described with respect to box 66 in FIG. 3) is 1500 rpm. More specifically, the engine 44 is fully loaded when the speed of the engine 44 decreases below 1600 rpm, and, to ensure that the engine 44 is fully loaded, the first predetermined threshold is set to require the speed of the engine to drop below 1500 rpm. In this embodiment, a master controller 56 of the electric drive system 12 has software that is configured to increase the normalized brake command until the engine speed decreases below the first predetermined threshold. More specifically, in this embodiment, the software of the master controller 56 has execution loops for analyzing the various characteristics of the electric drive system 12, and the software is configured to step the brake power up a predetermined amount for each execution loop of the software. The predetermined amount for stepping up the normalized brake command can be, for example, between about 1 and about 15. In the illustrated embodiment, the normalized brake command is increased until it reaches 275 (as shown in Plot 8 at point P), which causes the brake power to increase to about 160 kW (as shown in Plot 9 at point R). The increase in the normalized brake command to 275 causes the speed of the engine to decrease below the predetermined threshold (i.e., 1500 rpm) to about 1480 rpm (as shown in Plot 6 at point S), such that the engine 44 is fully loaded.

This embodiment of the method 60 subsequently includes maintaining the normalized brake command at 275 (as shown in Plot 8 at point T) and waiting for the speed of the engine 44 to increase to above a second predetermined threshold (as described with respect to box 68) indicating that the engine 44 is stabilized at full power. In this embodiment, the second predetermined threshold for the speed of the engine 44 (as described with respect to box 68 in FIG. 3) is 1580 rpm. That is, engine 44 is considered to be stabilized at full power once the speed increases above 1580 rpm. Referring to Plot 6, the speed of the engine increases above 1580 rpm at about the 11.75 second mark (shown at point U), and the speed of the engine stabilizes at about 1600 rpm at about the 12.5 second mark (shown at point Y). After the speed of the engine stabilizes at full power (e.g., at about the 12.5 second mark), the method 60 includes averaging the motor power (as described with respect to box 70) that was required to stabilize the engine 44 at full power. Referring to Plot 10 at time period V (which is between about the 12.5 second mark and about the 15.5 second mark), the average power of the motor 48 is calculated to be about 120 kW. After the average power of the motor is calculated during this predetermined time period, the method 60 includes comparing the calculated average power to a predetermined pass/fail power threshold (as described with respect to box 72 in FIG. 3). In this embodiment, the predetermined pass/fail power threshold (not shown) is about 110 kW, which indicates that the electric drive system 12 has sufficient power.

Figure 6:
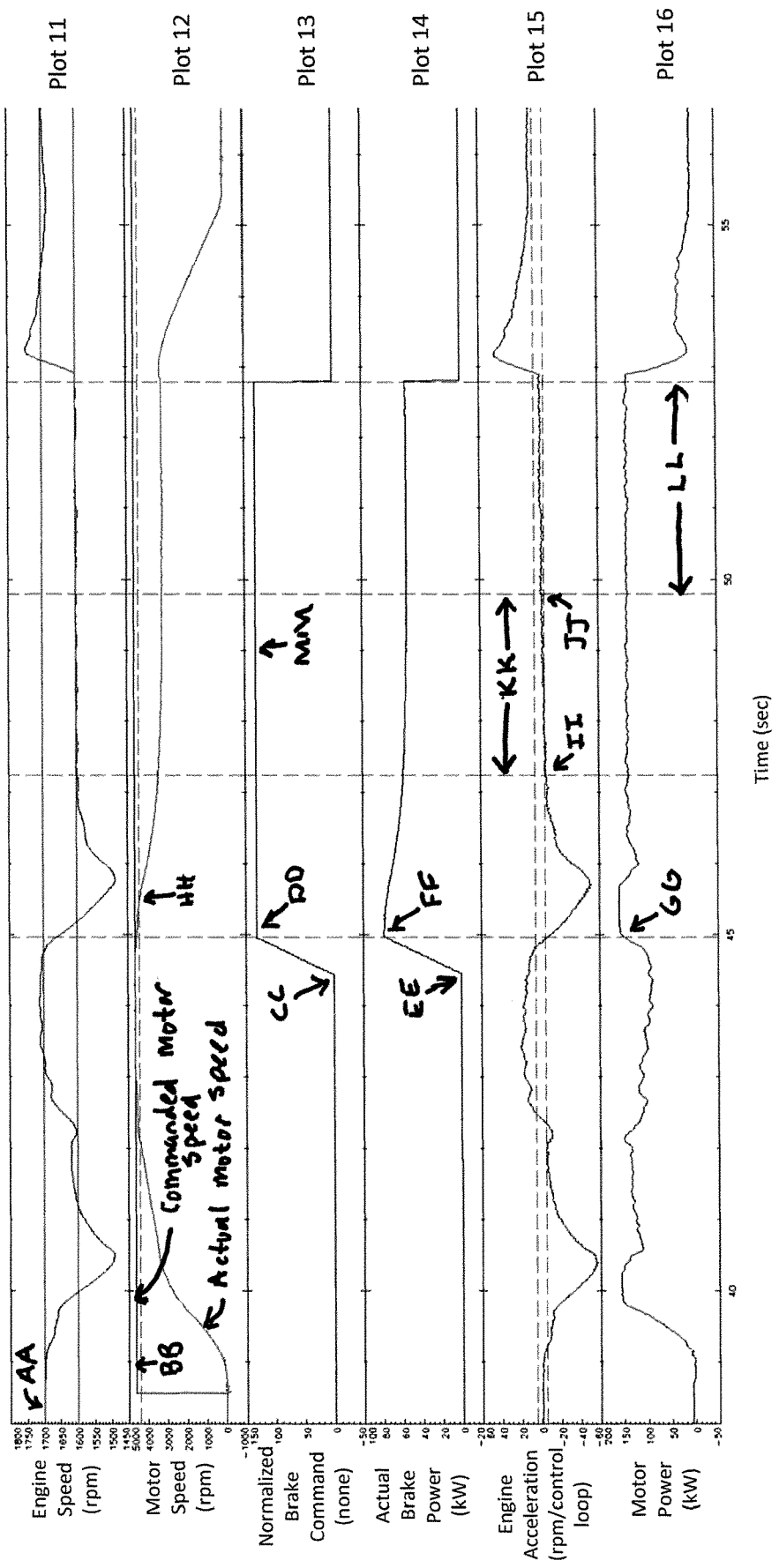
FIG. 6 illustrates various plots describing various characteristics of an electric motor with respect to time for another example of the method of FIG. 3.

FIG. 6 illustrates six plots (i.e., Plots 11-16) of various characteristics for an exemplary electric drive system 12 with respect to time during another example of the method 60 of FIG. 3. Plot 11 illustrates speed of the engine 44 (in rpm); Plot 12 illustrates the actual speed of the motor 48 (in rpm) and the commanded speed of the motor 48 (in rpm); Plot 13 illustrates the normalized brake command; Plot 14 illustrates the brake power of the electric drive system 12 (in kW); Plot 15 illustrates the acceleration of the engine (in rpm/control loop); and Plot 16 illustrates the power of the motor (in Kw). Referring to FIGS. 3 and 6, in this embodiment, the method 60 (as shown at boxes 61 and 62) includes setting the speed of the engine to 1700 rpm (as shown in Plot 11 at point AA) and setting the electric motor 48 to a commanded speed of 5000 rpm (as shown in Plot 12 at point BB). In the illustrated embodiment, a master controller 56 of the electric drive system 12 has software that is configured to set the speed of the engine 44 and the commanded speed of the motor 48.

Subsequently, the method 60 (as shown at box 64) includes increasing the normalized brake command from 0 to 140 (as shown in Plot 13, starting at point CC and ending at point DD), which causes the brake power to increase from 0 kW to about 80 kW (as shown in Plot 14, starting at point EE and ending at point FF). In this embodiment, the engine is determined to be fully loaded when the power of the motor 48 (as described with respect to box 66 in FIG. 3) is about 150 kW. More specifically, the engine 44 is fully loaded when the power of the motor 48 increases above 145 kW (i.e., the predetermined threshold). In this embodiment, a master controller 56 of the electric drive system 12 has software that is configured to increase the normalized brake command until the motor power increase above the predetermined threshold. More specifically, in this embodiment, the software of the master controller 56 has execution loops for analyzing the various characteristics of the electric drive system 12, and the software is configured to step the brake power up a predetermined amount for each execution loop of the software. The predetermined amount for stepping up the normalized brake command can be, for example, between about 1 and about 15. In the illustrated embodiment, the normalized brake command is increased until it reaches 140 (as shown in Plot 13 at point DD), which causes the brake power to increase to about 80 kW (as shown in Plot 14 at point FF). The increase in the normalized brake command to 140 causes the power of the motor 48 to increase above the predetermined threshold (i.e., 145 kW) to about 150 kW (as shown in Plot 16 at point GG), such that the engine 44 is fully loaded.

This embodiment of the method 60 subsequently includes maintaining the normalized brake command at 140 (as shown in Plot 13 at point MM) and waiting for the speed of the motor 48 to decrease below a predetermined threshold (as described with respect to box 68) indicating that the engine 44 should be at full power and the motor is in an operational region desired for power measurement. In this embodiment, the predetermined threshold for the speed of the motor 48 (as described with respect to box 68 in FIG. 3) is 4500 rpm. Referring to Plot 6, the speed of the motor 48 decrease below 4600 rpm at about the 45.6 second mark (shown at point HH). After the speed of the motor decreases below 4600 rpm, the method 60 includes waiting until the acceleration of the engine 44 settles between a predetermined upper threshold and a predetermined lower threshold for a predetermined amount of time. In this embodiment, the predetermined upper and lower thresholds are 5 rpm/loop control and −5 rpm/loop control, respectively, and the predetermined amount of time is about 2.8 seconds. Referring to Plot 15, the acceleration of the engine 44 increases above the lower predetermined threshold at about the 47 second mark (as shown at point II) and stays between the upper and lower threshold for the predetermined amount of time (as shown at time period KK between about the 47 second mark and the 49.8 second mark), which ensures that that engine 44 was stabilized at full power. Referring to Plot 16 at time period LL (which is between about the 49.8 second mark and about the 52.8 second mark), the average power of the motor 48 is calculated to be about 140 kW. After the average power of the motor is calculated during this predetermined time period, the method 60 includes comparing the calculated average power to a predetermined pass/fail power threshold (as described with respect to box 72 in FIG. 3). In this embodiment, the predetermined pass/fail power threshold (not shown) is about 120 kW, which indicates that the electric drive system 12 has sufficient power.

INDUSTRIAL APPLICABILITY

The disclosed mobile machines having an electric drive system and methods for testing the power of electric drive systems may be applicable to any mobile machine, such as, for example, mobile machines having ground engaging tracks, or any other suitable mobile machine known in the art where testing the power of the electric drive system is desired. In addition, the method 60 can be performed at the end-of-line during building of the mobile machine 10 or during a diagnostic service test of the mobile machine 10. In some embodiments, the method 60 can be performed in a factory or shop setting in which: the track of the vehicle is not installed; either of the axles downstream of the propulsion system is removed; the tracks installed and the mobile machine 10 is lifted in the air by a blade or ripper, or supported on stands; or the tracks installed and the mobile machine is moving along the ground.

The methods for testing the power of electric drive systems described herein provide a machine power test for testing the power of powertrains for vehicles utilizing an electric drive system rather than a torque converter. The methods described herein utilize an increased brake capability as the primary load on the electric drive system, which ensures that the engine will be fully loaded. That is, setting the motor at a desired speed and increasing the brake load until the engine is fully loaded ensures that the brake load is sufficient to cause the engine to become fully loaded. It is important that the engine becomes fully loaded during the test because a non-fully loaded engine will cause the test to provide inconsistent and inaccurate results.

The electric drive systems disclosed herein are advantageous because the systems include one or more controllers that are capable of performing at least a portion of the disclosed methods, which allows the power of the electric drive systems to be tested in an efficient way. In addition, the disclosed electric drive systems allow a vehicle owner (rather than a service professional) to test the power of the electric drive system by interacting with the electric drive system through a user interface and commanding the one or more controllers to perform the disclosed methods.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on-may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

ELEMENT LIST

| Element Number | Element Name |
|---|---|
| 10 | mobile machine |
| 12 | drive system |
| 14 | main frame |
| 16 | power source |
| 18 | work station |
| 20 | undercarriage |
| 22 | engaging tracks |

-continued

| Element Number | Element Name |
|---|---|
| 24 | push arms |
| 26 | work implement |
| 28 | roller frame |
| 30 | lift cylinders |
| 32 | tilt cylinders |
| 34 | driving members |
| 38 | idler wheels |
| 40 | mid-rollers |
| 42 | carrier rollers |
| 44 | engine |
| 46 | generator |
| 48 | electric motor |
| 50 | power electronics |
| 52 | power electronics controller |
| 53 | brakes |
| 54 | mechanical links |
| 55 | engine controller |
| 56 | master controller |
| 58 | memory |
| 59 | user interface |
| 60 | method |
| 61 | box |
| 62 | box |
| 64 | box |
| 66 | box |
| 67 | box |
| 68 | box |
| 70 | box |
| 72 | box |
| 74 | box |

The invention claimed is:

1. A mobile machine, comprising:
a main frame;
an undercarriage having one or more drive members; and
a drive system for providing power to the one or more drive members of the unercarriage, the drive system comprising:
an engine;
one or more motors operatively connected to the one or more drive members of the undercarriage; and
a power converter operatively connected to the engine, wherein the power converter is configured to convert mechanical energy from the engine to energy for providing to the one or more motors;
one or more controllers in circuit communication with at least one of the engine, the power converter, and the one or more motors, wherein the one or more controllers are configured to:
set the one or more motors to a desired commanded speed;
apply an initial commanded brake load to the drive system;
increase the initial commanded brake load until the engine is fully loaded;
stabilize the engine at full power after the engine is fully loaded;
calculate an average power of the drive system after the engine is stabilized at full power.

2. The mobile machine according to claim 1, wherein the drive system is an electric drive system, wherein the one or more motors comprise an electric motor, wherein the power converter is a generator that is configured to convert mechanical energy from the engine to electrical energy for providing to the one or more motors, and wherein the electric drive system further comprises power electronics configured to control the electrical energy that is provided to the electric motor by the generator.

3. The mobile machine according to claim 1, wherein the drive system is a hydrostatic drive system, and wherein the power converter comprises one or more pumps configured to convert mechanical energy from the engine to fluid energy for providing to the one or more motors.

4. The mobile machine according to claim 1, wherein the drive system is an electric drive system, and wherein the one or more controllers are configured to calculate the average power of the electric drive system by calculating the average of at least one of a power of a motor shaft of the motor, a motor AC power, a DC bus power, a power of a generator shaft, and a generator AC power.

5. The mobile machine according to claim 1, wherein the one or more controllers are configured to increase the initial commanded brake load until the engine is fully loaded by increasing the commanded brake load until the speed of the engine decreases below a first predetermined threshold.

6. The mobile machine according to claim 5, wherein the one or more controllers are configured to stabilize the engine at full power by maintaining the brake load after the speed of the engine decreases below the first predetermined threshold at least until the speed of the engine increases above a second predetermined threshold.

7. The mobile machine according to claim 6, wherein the one or more controllers are configured to calculate the average power of the drive system after the engine is stabilized at full power by averaging a power of the one or more motors for a predetermined period of time after the speed of the engine increases above the second predetermined threshold.

8. The mobile machine according to claim 7, wherein the one or more controllers are further configured to compare the average power of the drive system to a predetermined pass/fail threshold and determine a result based on the comparison between the average power and the predetermined pass/fail threshold.

9. The mobile machine according to claim 1, wherein the one or more controllers are configured to increase the initial commanded brake load until the engine is fully loaded by increasing the commanded brake load until the power of the drive system increases above a predetermined threshold.

10. The mobile machine according to claim 9, wherein the one or more controllers are configured to stabilize the engine at full power by maintaining the brake load after the power of the motor increases above the predetermined threshold at least until the speed of the motor decreases below a predetermined threshold.

11. The mobile machine according to claim 10, wherein the one or more controllers are configured to stabilize the engine at full power by maintaining the brake load after the speed of the motor decreases below the second predetermined threshold at least until the acceleration of the engine remains between an upper predetermined threshold and a lower predetermined threshold for a predetermined period of time.

12. The mobile machine according to claim 11, wherein the one or more controllers are configured to calculate the average power of the drive system after the engine is stabilized at full power by averaging a commanded power of the motor for a second predetermined period of time after the acceleration remains between the upper predetermined threshold and the lower predetermined threshold for the predetermined period of time, and wherein the one or more controllers are further configured to compare the average power of the drive system to a predetermined pass/fail threshold and determine a result based on the comparison between the average power and the predetermined pass/fail threshold.

13. An electric drive system for a mobile machine, the electric drive system comprising:
an engine;
an electric motor operatively connected to one or more drive members of the mobile machine; and
a generator operatively connected to the engine, wherein the generator is configured to convert mechanical energy from the engine to electrical energy for providing to the electric motor;
power electronics configured to control the electrical energy that is provided to the electric motor by the generator;
one or more controllers in circuit communication with at least one of the engine, the generator, and the electric motor, wherein the one or more controllers are configured to:
set the electric motor to a desired commanded speed;
apply an initial commanded brake load to the electric drive system;
increase the initial commanded brake load until the engine is fully loaded;
stabilize the engine at full power after the engine is fully loaded;
calculate an average power of the electric drive system after the engine is stabilized at full power.

14. The electric drive system according to claim 13, wherein:
the one or more controllers are configured to increase the initial commanded brake load until the engine is fully loaded by increasing the commanded brake load until the power of the motor increases above a predetermined threshold;
the one or more controllers are configured to stabilize the engine at full power by maintaining the brake load after the power of the motor increases above the predetermined threshold at least until the speed of the motor decreases below a second predetermined threshold;
the one or more controllers are configured to stabilize the engine at full power by maintaining the brake load after the speed of the motor decreases below the second predetermined threshold at least until the acceleration of the engine remains between an upper predetermined threshold and a lower predetermined threshold for a predetermined period of time;
the one or more controllers are configured to calculate the average power of the electric drive system after the engine is stabilized at full power by averaging a commanded power of the motor for a second predetermined period of time after the acceleration remains between the upper predetermined threshold and the lower predetermined threshold for the predetermined period of time; and
the one or more controllers are further configured to compare the average power of the electric drive system to a predetermined pass/fail threshold and determine a result based on the comparison between the average power and the predetermined pass/fail threshold.

15. The electric drive system according to claim 13, wherein the one or more controllers are configured to calculate the average power of the electric drive system by calculating the average of at least one of a power of a motor shaft of the motor, a motor AC power, a DC bus power, a power of a generator shaft, and a generator AC power.

16. A method of testing power of an electric drive system having an engine and an electric motor, the method comprising:
   setting the electric motor to a desired commanded speed;
   applying an initial brake load to the electric drive system;
   increasing the initial brake load until the engine is fully loaded;
   stabilizing the engine at full power after the engine is fully loaded; and
   calculating an average power of the electric drive system after the engine is stabilized at full power.

17. The method according to claim 16, wherein the initial brake load is increased by a controller that is in circuit communication with at least one of the engine and the electric motor.

18. The method according to claim 16, wherein:
   the increasing the initial brake load until the engine is fully loaded includes increasing the initial brake load until the power of the motor increases to a predetermined threshold;
   the stabilizing the engine at full power after the engine is fully loaded includes maintaining the brake load after the power of the motor increases above the predetermined threshold at least until the speed of the motor decreases below a second predetermined threshold;
   the stabilizing the engine at full power after the engine is fully loaded includes maintaining the brake load after the speed of the motor decreases below the second predetermined threshold at least until the acceleration of the engine remains between an upper predetermined threshold and a lower predetermined threshold for a predetermined period of time.

19. The method according to claim 16, further comprising comparing the average power of the electric drive system to a predetermined pass/fail threshold and determining a result based on the comparison between the average power and the predetermined pass/fail threshold.

20. The method according to claim 16, wherein the calculating the average power of the electric drive system comprises calculating the average of at least one of a power of a motor shaft of the motor, a motor AC power, a DC bus power, and a generator AC power.

* * * * *